Figure 1:
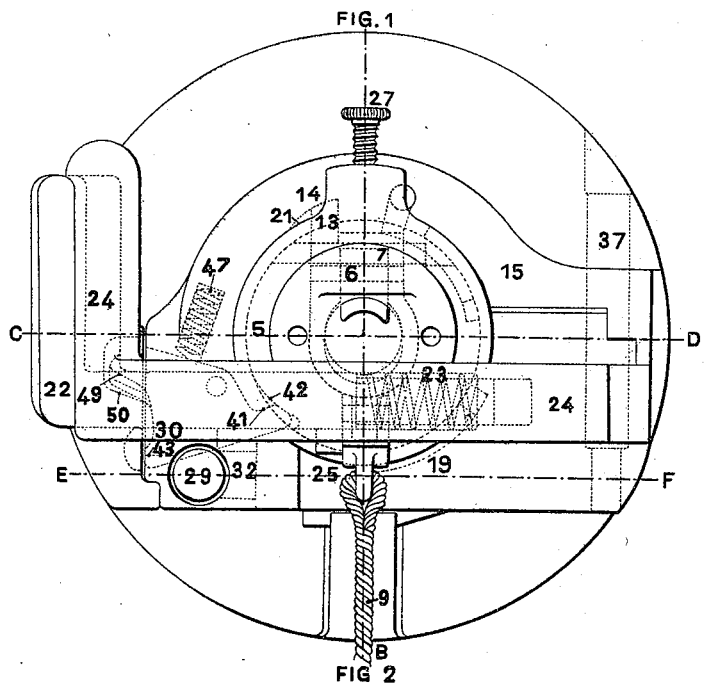

No. 644,005. Patented Feb. 20, 1900.
M. DARMANCIER & A. DALZON.
BREECH CLOSING MECHANISM FOR ORDNANCE.
(Application filed Feb. 5, 1898.)

(No Model.) 4 Sheets—Sheet 1.

Witnesses:

Inventors:
Michel Darmancier,
Aimé Dalzon,
By James L. Norris
Atty.

THE NORRIS PETERS CO., PHOTO-LITHO., WASHINGTON, D. C.

No. 644,005. Patented Feb. 20, 1900.
M. DARMANCIER & A. DALZON.
BREECH CLOSING MECHANISM FOR ORDNANCE.
(Application filed Feb. 5, 1898.)
(No Model.) 4 Sheets—Sheet 2.
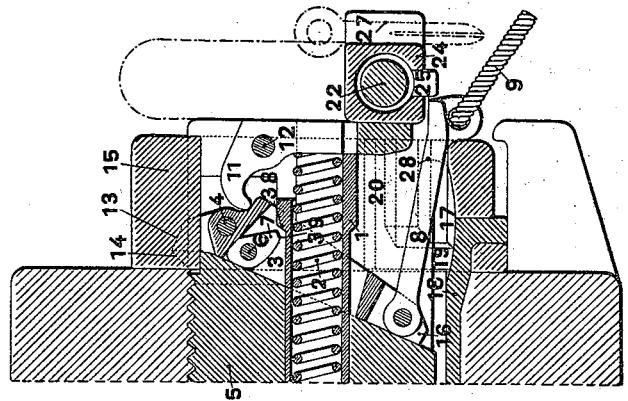
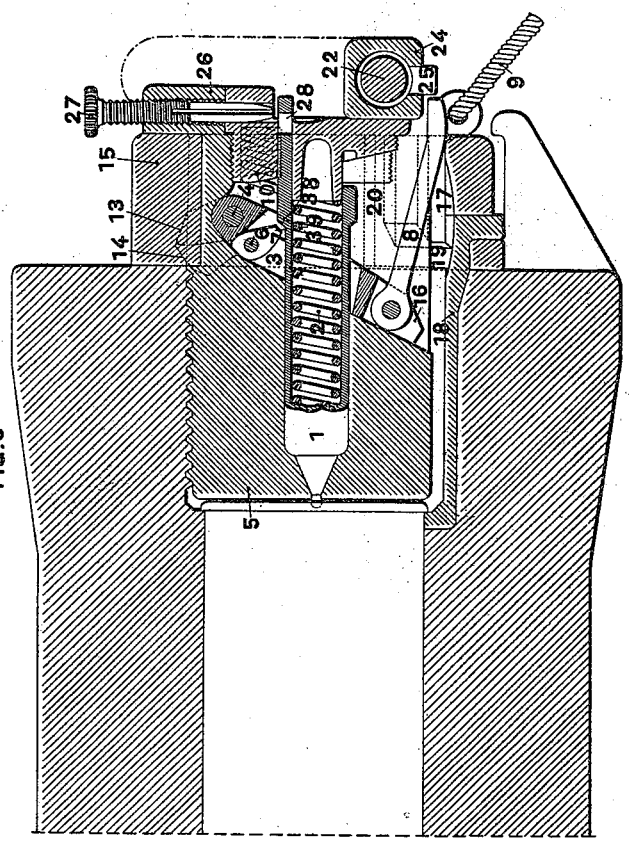

No. 644,005. Patented Feb. 20, 1900.
M. DARMANCIER & A. DALZON.
BREECH CLOSING MECHANISM FOR ORDNANCE.
(Application filed Feb. 5, 1898.)
(No Model.) 4 Sheets—Sheet 3.
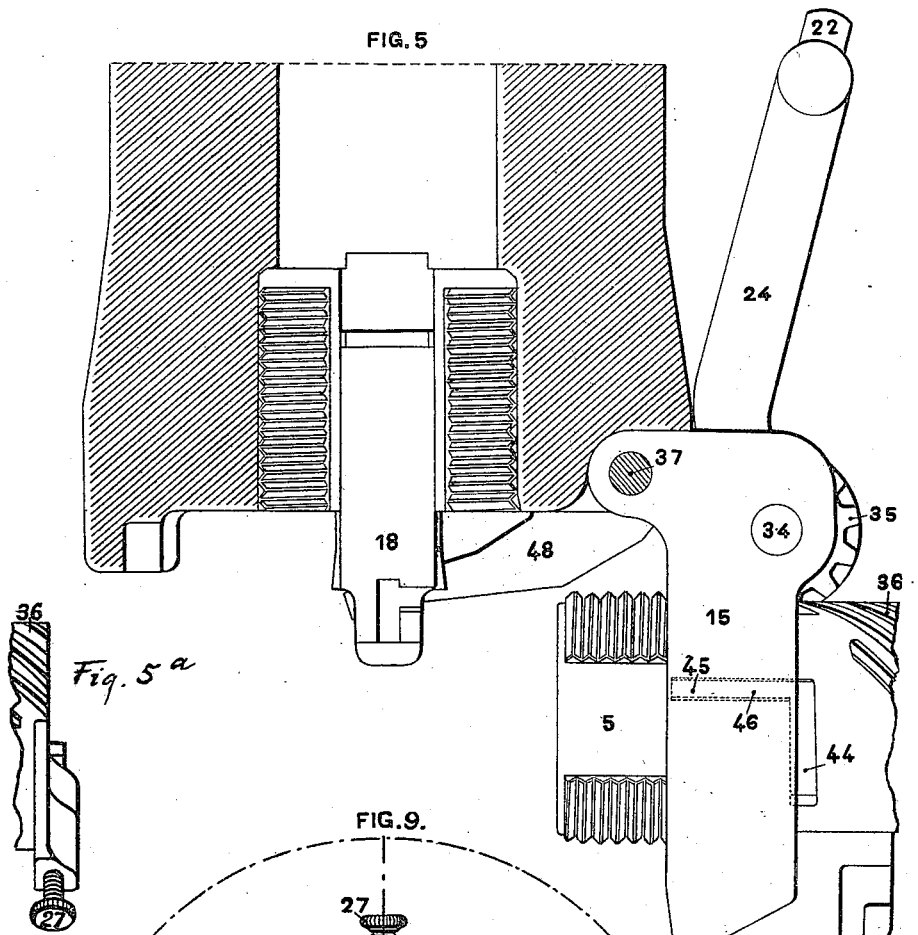
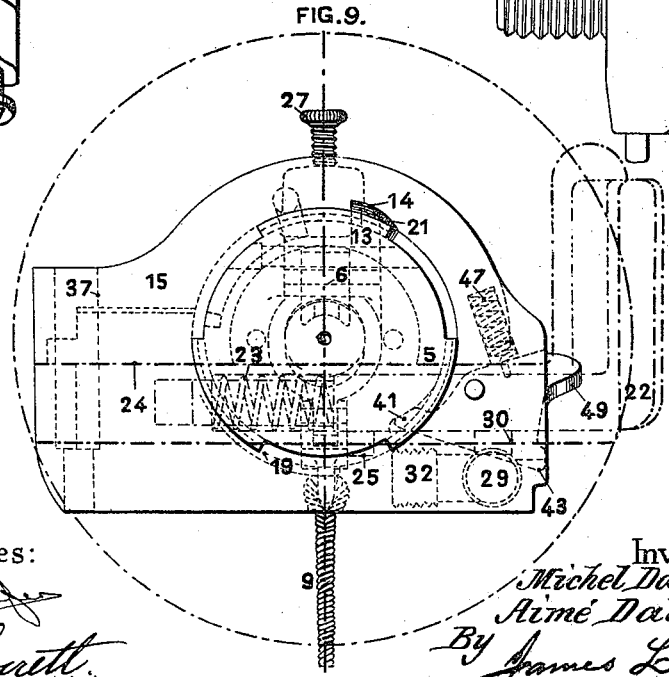
Witnesses:
Inventors:
Michel Darmancier.
Aimé Dalzon.
By James L. Norris
Att'y.

No. 644,005. Patented Feb. 20, 1900.
M. DARMANCIER & A. DALZON.
BREECH CLOSING MECHANISM FOR ORDNANCE.
(Application filed Feb. 5, 1898.)
(No Model.) 4 Sheets—Sheet 4.
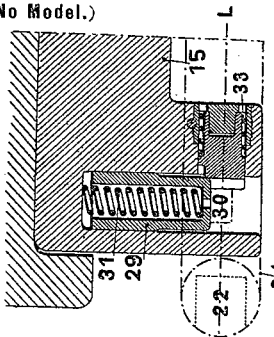
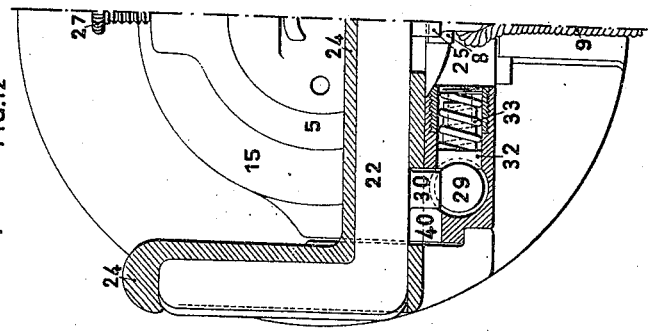
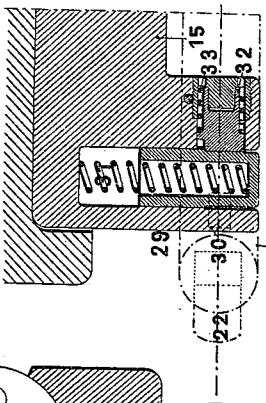
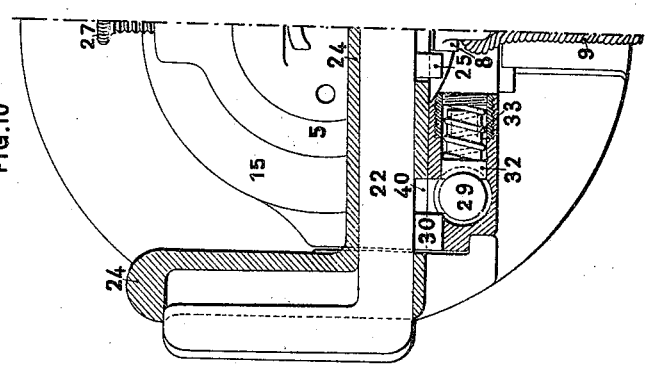
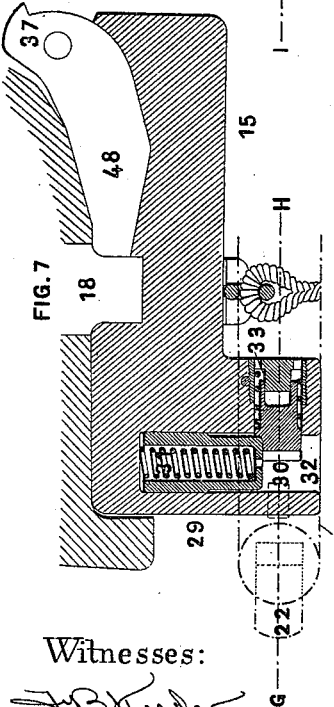
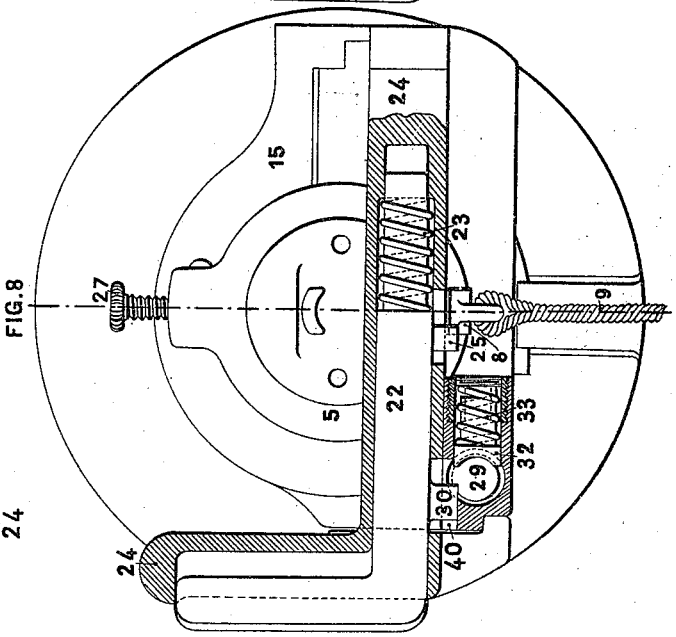
Witnesses:
Inventors:
Michel Darmancier
Aimé Dalzon
By James L. Norris
Att'y

UNITED STATES PATENT OFFICE.

MICHEL DARMANCIER AND AIMÉ DALZON, OF ST. CHAMOND, FRANCE.

BREECH-CLOSING MECHANISM FOR ORDNANCE.

SPECIFICATION forming part of Letters Patent No. 644,005, dated February 20, 1900.

Application filed February 5, 1898. Serial No. 669,282. (No model.)

*To all whom it may concern:*

Be it known that we, MICHEL DARMANCIER and AIMÉ DALZON, citizens of the Republic of France, residing at St. Chamond, Loire, France, have invented certain new and useful Improvements in Breech-Closing Mechanism for Ordnance, (for which we have obtained Letters Patent in France, No. 270,523, dated January 7, 1898,) of which the following is a specification.

This invention relates to breech-closing mechanism for ordnance of any caliber; and it has reference more particularly to the firing mechanism, the safety devices, and the mechanism for operating the breech-block.

The object of our invention is to enable the successive cocking and releasing of the firing-pin to be effected by one pull on the lanyard and to avoid premature firing whatever the form of the breech mechanism, and, further, to prevent the unlocking of the breech in case of hang-fire when the locking and unlocking movements are effected by a single rotary movement of the breech-lever. The combination, in a breech mechanism, of these improved arrangements constitutes an entirely-distinct locking means, which we have shown, by way of example, in the drawings and which is supposed to be used in connection with a case-shot; but it must be understood that we do not limit ourselves thereto.

Figure 2:
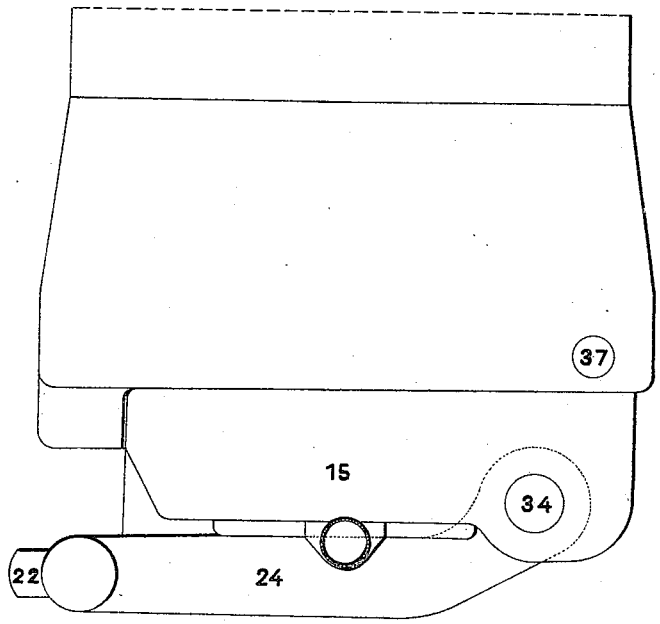

In the accompanying drawings, Figure 1 is a rear end view of the breech mechanism locked; Fig. 2, a plan of the same; and Fig. 3, a longitudinal section taken on the line A B of Fig. 1, the breech being supposed to be locked and the shot fired. Fig. 4 represents a similar view to the previous figure of a slightly-modified arrangement. Fig. 5 is a horizontal section taken on the line C D of Fig. 1 and through the breech end, the locking mechanism and the extractor being shown in plan and in position when the breech is fully open. Fig. 5ª is a fragmentary portion of the breech-screw broken away from the right of the preceding figure. Figs. 6, 7, and 11 are horizontal sections of the breech and its mechanism, taken on the line E F of Fig. 1, showing in detail and in its various positions the safety device for use in case of hang-fires, Fig. 6 showing the position occupied by the same at the moment of firing, Fig. 7 that after firing, and Fig. 11 that at the moment of turning the lever against the rear of the breech-screw and before the handle-bolt has entered the recess in the swinging carrier. Fig. 8 is a rear end view of the breech mechanism, partly in section. Fig. 9 is a view similar to Fig. 1 looking at the opposite side. Fig. 10 is a sectional rear end view of one-half of the breech mechanism. Fig. 11, as before mentioned, shows parts of the breech mechanism at the moment of turning the lever against the rear of the breech-screw, but before the bolt has entered the recess in the swinging carrier. Fig. 12 is a sectional rear end view similar to Figs. 8 and 10, but with the interlocking lug in a different position.

The firing mechanism, Fig. 3, comprises the firing-pin 1, which is pressed forward by its spring 2 and operated rearwardly by a lever 3, movable about a transverse axis 4, carried in the breech-screw 5, (or breech-closing block.) This lever 3 carries an axis 6, on which is loosely pivoted a tappet or pawl 7, and at the lower end of said lever there is pivoted a bar 8, to which is attached the lanyard 9. These various parts are always under the action of a coiled spring 10, which by pressing the lever 3 tends to restore them to the position shown in Fig. 3. The pawl 7 is loosely mounted on the pivot 6; but the head of the said pawl is eccentric or cam-shaped, as shown in Figs. 3 and 4, so that this head, owing to the gravity of the pawl 7, abutting against the sloping face of the lever 3, the said pawl cannot swing freely and its nose is rotated upward together with the lever 3, around the axis 4 when the lanyard 9 is pulled backward, and, at the end of this movement, escapes from the firing-pin, which latter is drawn rearward on a straight line—the geometrical axis of the breech-block. A similar effect may, as hereinafter described, be obtained by the arrangement shown in Fig. 4, wherein a lever 11 is substituted for the spring 10 and is movable about an axis 12, carried by the breech-screw (or block) 5. One end of this lever is in contact with the lever 3 and the other end serves as a bearing for the spring 2 of the firing-pin 1. The spring 2 is subjected to an initial compression strong enough by acting on the lever 11 to restore the lever 3 to its normal position directly the lanyard is released. The other parts of the mechanism are the same as those illustrated in Fig. 3.

The lever 3 is provided at its upper end with a nose 13, which when the breech is completely closed is free to enter a recess 14 in the swinging screw-carrier 15, (or in the breech.) In this closed position the end 16 of the lever 3 comes exactly in front of a circular groove 17, formed in the breech or in the extractor 18, or in the swinging screw-carrier (if the closing of the breech is effected by a screw) or in the breech, (if closed by a block.)

In the arrangements shown in the drawings as having a locking-screw and a screw-carrier the latter is provided with a helicoidal transverse groove 19 and a longitudinal groove 20 to receive the extremity 16 successively during the rotation and the removal of the breech-screw 5.

In the screw-carrier (or in the breech) is formed an inclined plane 21, Fig. 1, along which passes the nose 13 at the beginning of the rotary movement of the breech-screw, for the purpose hereinafter explained.

The locking-bolt 22, controlled by a spring 23, Fig. 1, carried by the breech-lever 24, is provided with a lug or projection 25, which comes opposite the bar 8 when the bolt 22 is not in its locking position.

Through a tapped nut 26, formed in one with the breech-screw 5, is screwed a split pin 27, Fig. 3, adapted to enter a hole 28, drilled in the rear end of the firing-pin 1 in such a position that the point of this latter is away from the primer so long as the firing-pin is held by the pin 27.

In the modification shown in Fig. 4 the split pin 27 is carried by the lever 24, and its lower extremity is caused to enter a hole 28 in the bar 8 whenever the firing-pin is brought into the safety position, as will be hereinafter described.

The breech-closing mechanism is further provided with a safety device for guarding against accident through hang-fire, consisting, essentially, of an inertia block or plunger 29, Figs. 1, 6, 7, and 11, located near the interlocking lug 30 of the lever 24. This inertia block or plunger is urged outwardly by a coiled spring 31 and is adapted to be held by a stop 32, actuated by a spring 33.

The entire mechanism is operated by a hand-lever 24, Fig. 5, movable about a pin 34 and connected with a pinion 35, gearing into the helicoidal threads 36 on the breech-screw 5.

The operation, taken step by step, is as follows, supposing the gun to have been just fired and to have returned to battery: The various parts of the firing mechanism are in the position shown in Fig. 3 or in Fig. 4, having been brought thereinto by the action of the springs 2 and 10 in the first case or by the spring 2 alone in the second case, owing to the initial compression of such springs. On the recoil of the gun after firing, the spring 31 of the safety device, if hang-fire has not taken place, is compressed, and the block or plunger 29 by reason of its inertia has advanced on the finish of the recoil to the forward end of its stroke, as shown at Fig. 7, relatively to the breech mechanism, in which position it is caught by a stop 32, which has been pushed outward by its spring 33. In this state the breech is free to be opened in the following manner: The lever 24 is gripped by its handle, and at the same time the bolt 22 is pressed inward by the fingers, and the lever is then turned from left to right until it strikes against the reinforced end of the breech, as shown in Fig. 5. This movement, which takes place about the axis 34 while the breech-screw is being disengaged from its threads and then about the axis 37, determines the rotation and the removal of the breech-screw 5 through the gearing of the helicoidal teeth of the pinion 35 with the corresponding threads 36 on the screw 5. On the finish of the movement about the axis 37 the shock to the carrier 15 causes the extractor 18 to eject the empty case from the breech. On the beginning of the movement of the lever 24 about its pin 34 the lug or projection 30 becomes disengaged from its recess, and after having moved rearward a slight distance (about two millimeters) behind the inertia block or plunger pushes back the stop 32 and thereby disengages said block, which now under the action of its spring comes first against the lug or catch 30 (see Fig. 8) and then on the lever moving farther away takes up the position shown in Fig. 6. After the gun has been loaded the breech is closed in a similar but reverse manner to that described with reference to the opening of the breech. During the closing movement the lug 30 moves the inertia-block 29 inward to a distance of about two millimeters from its forward position, which is insufficient to lock it, (position represented in Fig. 11). Then the lug 30 being in the position "breech closed" the block 29 takes up the position shown in Fig. 6, thus preventing the breech from being opened so long as the charge has not been fired, especially when hang-fire occurs. The breech being thus securely closed and the firing-pin 1 held at the forward end of its stroke by the spring 2, which takes up its bearing either directly on the screw 5 (or breech-block) or through the medium of a plug fixed to the rear end of such screw or block, it is only necessary in order to effect the cocking and the release of the firing-pin to pull the lanyard as far as it will go. The lever 3 then turns on its axis 4, the pawl or tappet 7 engages the heel or flange 38 of the firing-pin, and the springs 2 and 10 (or only the spring 2 in the arrangement shown in Fig. 4) are compressed toward the rear. At the end of the stroke of the lever 3 the tappet 7 escapes from the heel or flange 38 by reason of the nib of the tappet moving through an arc of a circle having for its center the axis 4 and the firing-pin 1 following a straight line, and said firing-pin is shot forward by its spring against the primer or fuse. If in the second position of the lever 3 the lanyard be not pulled, the lever 3 is restored to the forward position by the spring 10, Fig. 3, (or by the spring 2, Fig. 4.) During this movement the tappet 7 slides over the heel or flange 38 of the firing-pin and turns relatively to the lever 3 on its axis 6. At the end of the forward movement of the lever 3 the extremity 39 of the tappet 7 strikes against the bottom of the groove in the breech-screw (or breech-block) and is thus restored to its initial position.

It is clear from what has been stated that for cocking and releasing the firing-pin it needs but to exert a full pull on the lanyard and for repeating this operation to allow the lanyard to return to its initial position, and this may be effected as often as may be desired without interfering with the breech mechanism.

The nose 13 of the lever 3 serves to prevent premature firing. To this end it acts concurrently with the opposite extremity 16 of the same lever and establishes relation between the firing mechanism and the swinging carrier 15 or the breech, the said mechanism being dependent on the hand-lever 24 through the bar 8.

It will thus be understood from the preceding that in order to enable the lever 3 to move and effect the cocking and the releasing of the firing-pin 1 and to repeat these movements the nose 13 must be opposite the recess 14 in the swinging carrier 15 (or in the breech) when the breech-screw 5 (or breech-block) is in its locked position and that in this position the extremity 16 must be exactly opposite the circular groove 17. In any other position the lever is prevented from moving sufficiently to produce the cocking for firing. In the case (taken by way of example) where a breech-screw and carrier are employed a helicoidal transverse groove 19 and a longitudinal groove 20 are formed in the carrier 15 to receive the extremity 16 successively during the rotary and linear movements of such breech-screw 5, and said two grooves prevent the full movement of the lever 3. The nose 13 has further for its purpose to prevent the firing-pin 1 from projecting into the breech-screw (or block) at any other time than when the breech is closed by partially cocking the firing-pin 1 so far as to bring the striking-point of the latter inside the front end of the screw (or block) by about two to three millimeters and retaining it until the breech is completely closed. This result is obtained from the very commencement of opening of the breech by the nose 13 sliding over the inclined plane 21, which forces the lever 3 to move slightly backward, and therefore to cause the firing-pin 1 to retire sufficiently to prevent the point of the latter projecting beyond the front face of the screw 5, (or block.)

The lug or projection 25 on the locking-bolt 22, provided with the spring 23, serves to prevent the bar 8 being moved by the lanyard 9 so long as the lever 24 is not engaged in the carrier 15, (or in the breech.) The said lug comes in front of the rear end of the bar 8 whenever the bolt is not locked, and hence prevents the cocking and the releasing of the firing-pin 1, which obviously can only be effected when the bar 8 is permitted to move freely; but in this instance the bar is prevented from being moved by the lug 25, which hinders it so long as the locking-bolt 22 has not gone fully home.

The screw-pin 27, carried in the tappet-lug 26 of the breech-screw, is provided for the purpose of preventing accidental firing *en route* or during manipulation when the gun is loaded. To this end while the gun is not in battery and in its firing position the split pin remains engaged in the hole 28 in the rear end of the firing-pin 1, so as to keep the point of the latter away from the primer.

In the modification shown in Fig. 4 the hand-lever 24 carries the screw split pin 27, and the hole 28, into which such pin engages, (whenever the firing-pin is to be placed into a safety position,) is arranged in the bar 8; but the operation is absolutely the same as in the previous case.

The type of breech mechanism which we have just described by way of example is particularly adapted for use with case-shot; but it is evident that the same system may be adapted equally well and without any essential modification to breech-closing mechanism with plastic obturation where the projectile is independent of the charge.

Having now particularly described and ascertained the nature of our said invention and in what manner the same is to be performed, we declare that what we claim is—

1. In breech-closing mechanism for ordnance of any caliber, a percussion firing mechanism consisting essentially of a spring firing-pin 1, the cocking and the releasing of which are effected at one and the same time by means of a lever 3 pivotally arranged within the interior of the breech-screw (or breech-block) and operated by means of a lanyard, the said lever actuating the firing-pin through the medium of a loosely-pivoted pawl or tappet and means for moving said lever into grooves in the swinging carrier and causing it to remain there engaged during the opening and closing movements of the breech.

2. In a breech-closing mechanism for ordnance, the combination with the reciprocating firing mechanism, of a screw split pin carried by a part of the breech mechanism that is stationary when the breech is closed and placed adjacent to the reciprocating firing mechanism and adjustable to enter a hole in a movable part of said mechanism to hold it from reciprocation, substantially as specified.

3. The combination in a breech-closing mechanism, of the reciprocating firing mechanism, a hand-lever mounted for angular movement about axes at substantially right angles to the axial line of the gun to open and close the breech, a sliding part on said lever having a movement transversely of the gun to unlock the lever, and a lug carried by said lever out of the path of the firing mechanism when the lever is locked and movable into the path of the firing mechanism by the unlocking movement of said sliding part, substantially as and for the purpose specified.

In witness whereof we have hereunto set our hands in presence of two witnesses.

MICHEL DARMANCIER.
AIMÉ DALZON.

Witnesses:
  LÉON GRANGER,
  HASTINGS BURROUGHS.